Nov. 28, 1961
L. J. ANDRES
3,010,382
CONTINUOUS BEVERAGE MAKER
Filed Nov. 29, 1956
4 Sheets-Sheet 1
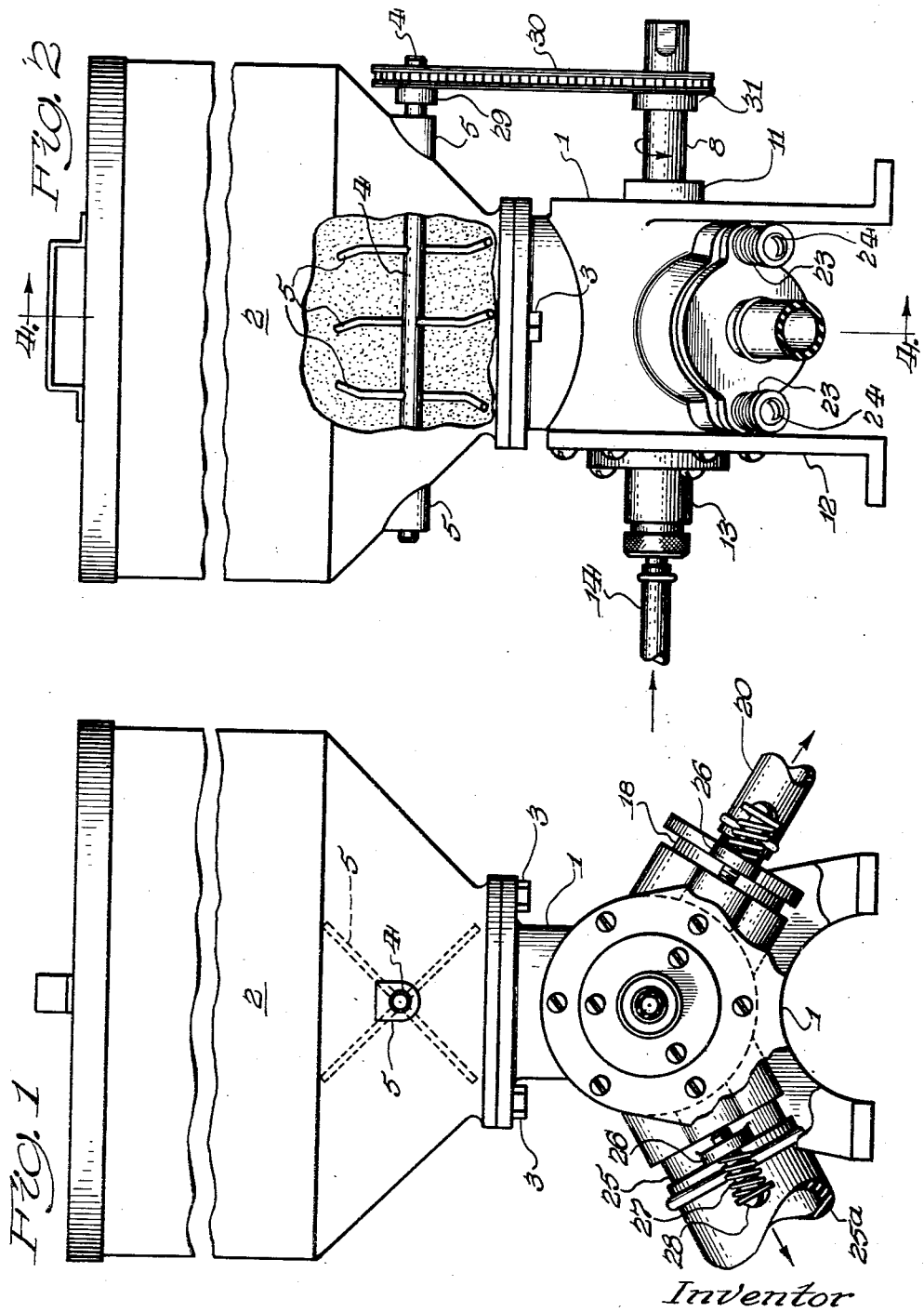
Inventor
Lloyd J. Andres Nov. 28, 1961  L. J. ANDRES  3,010,382
CONTINUOUS BEVERAGE MAKER
Filed Nov. 29, 1956  4 Sheets-Sheet 2
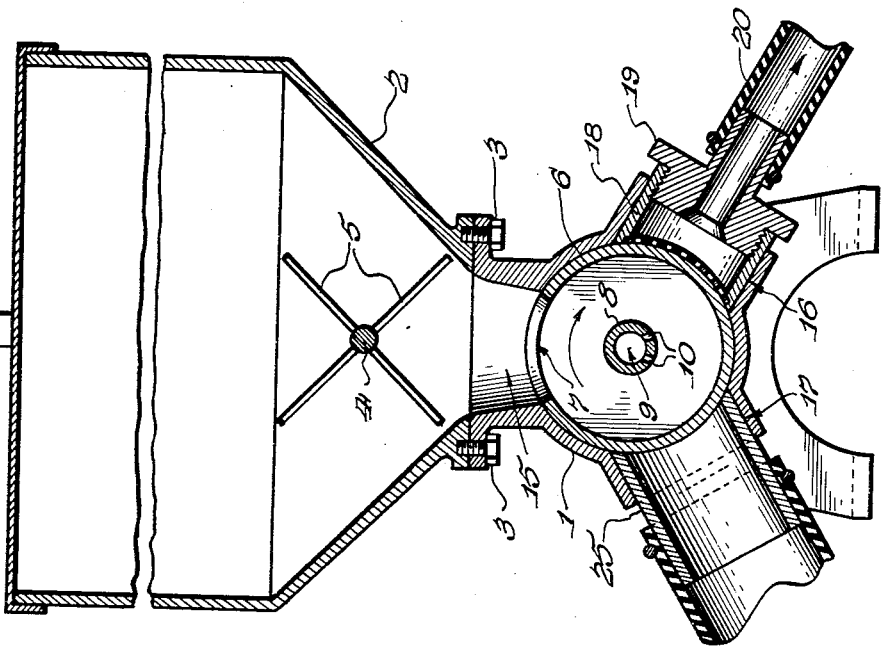
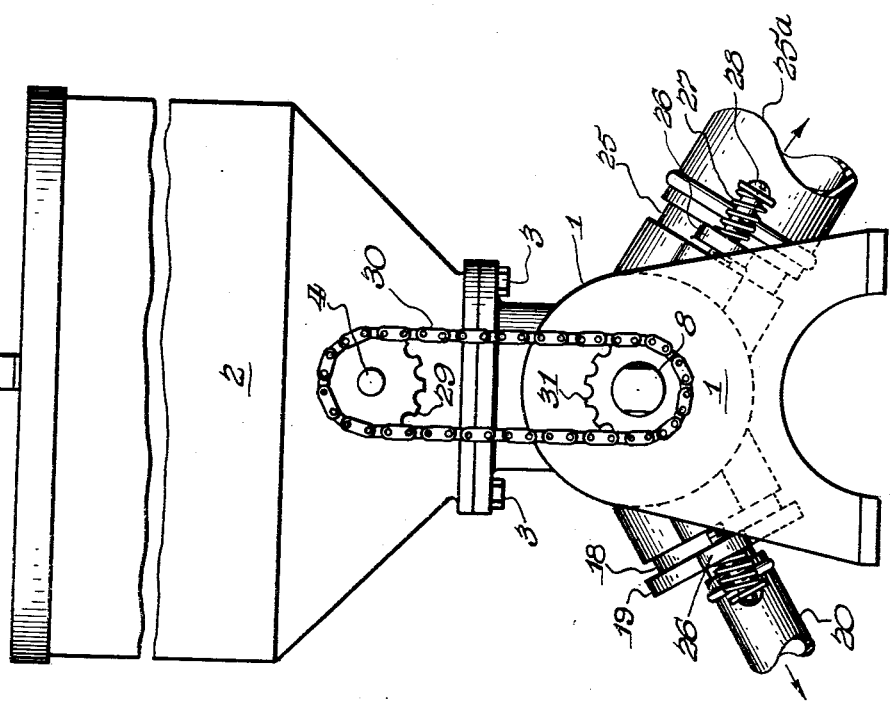
Inventor
Lloyd J. Andres Nov. 28, 1961     L. J. ANDRES     3,010,382
CONTINUOUS BEVERAGE MAKER Filed Nov. 29, 1956     4 Sheets-Sheet 3

Inventor
Lloyd J. Andres

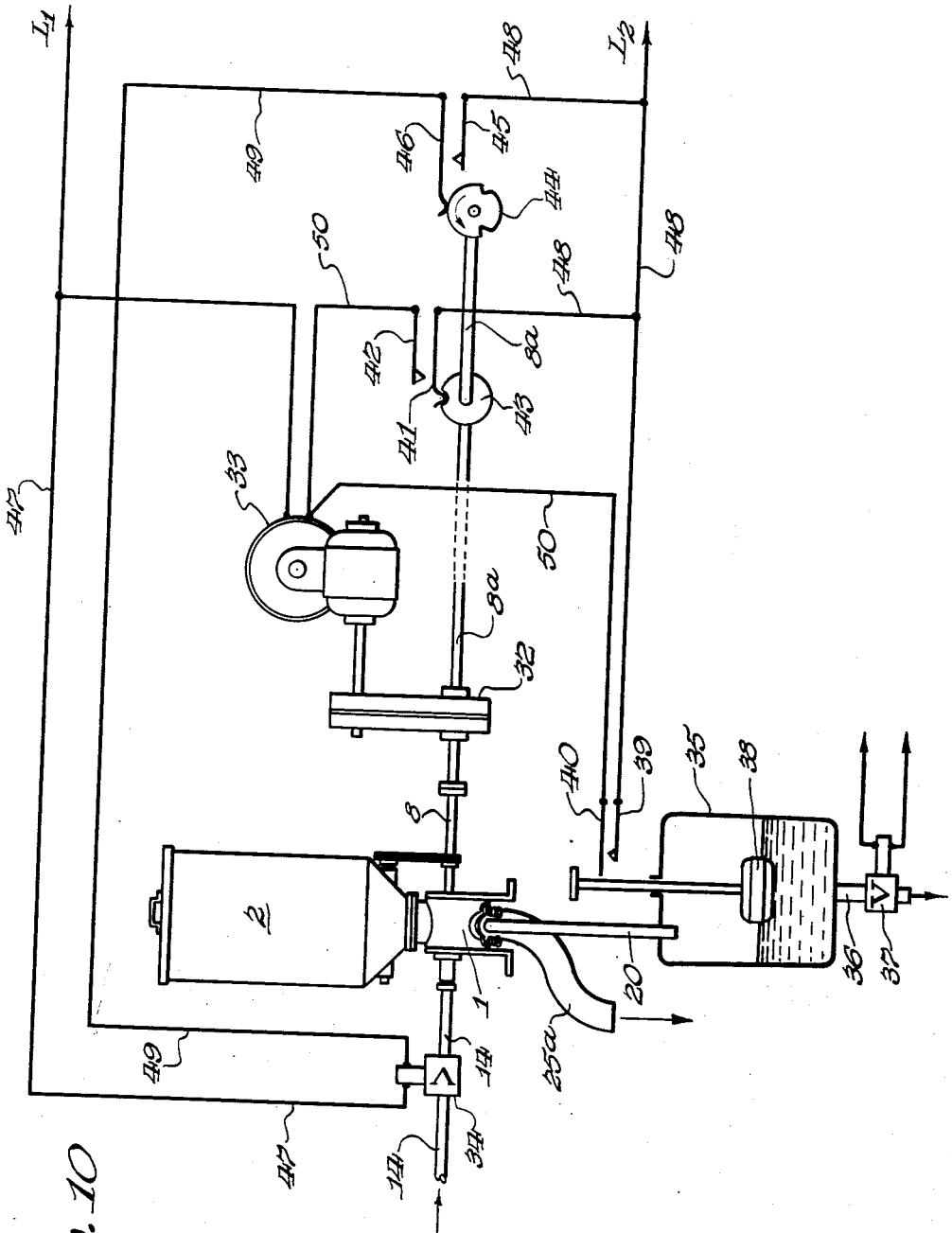

United States Patent Office 3,010,382
Patented Nov. 28, 1961

3,010,382
CONTINUOUS BEVERAGE MAKER
Lloyd J. Andres, Miami, Fla., assignor to Apco, Inc.,
a New York company
Filed Nov. 29, 1956, Ser. No. 625,006
3 Claims. (Cl. 99—289)

This invention relates in general to machines for making infusion type beverages and more particularly, to an automatic machine for the continuous production of unit quantities of coffee, tea, soup and like beverages.

Machines previous to this invention used a variety of complicated structures such as a plurality of movable canisters or reciprocating chambers for accomplishing the loading infusion delivery and scavenger cycles for making the beverages. Such devices are excessively complicated, expensive, difficult to service, and result in a questionable degree of sanitation.

The present invention is a solution for this long sought problem and overcomes the above objections and disadvantages by the provision of a relatively simple low-cost and sealed rotary device which performs all of the cycles required for continuously producing unit quantities of beverage by the intermittent movement of a principal element therein, which device embraces the principal object of the machine.

Another object of the invention is the provision of a ported cylindrical chamber in which a barrel is adapted to intermittently rotate to receive infusion ingredients, transfer same for infusion and the delivery of the finished beverage, and upon further rotation to scavenge the spent ingredients for each revolution of said barrel.

Another object of the invention is the provision of a cylindrical chamber having independent ports therein for receiving ingredients, receiving pressurized liquid, discharging finished beverage and scavenging the spent ingredients by the intermittent rotation of a barrel coaxially positioned in said chamber.

A further object of the invention is the provision of a cylindrical chamber with a ported rotary transfer barrel therein including stationary delivery manifolds adapted to operate in sealed relation with said barrel.

Another object of the invention is the provision of a self-cleaning ingredient filter in the beverage delivery manifold adapted to be cleaned during each revolution of the transfer barrel.

These and other objects and advantages in one embodiment of the invention are described and shown in the following specification and drawings in which:

FIG. 1 is the front elevation of the beverage machine.

FIG. 2 is the side elevation of the machine, shown in FIG. 1.

FIG. 3 is a rear elevation of the machine shown in FIG. 1.

FIG. 4 is a cross-sectional elevation taken through section-line 4—4, FIG. 2.

FIG. 10 is a diagrammatic showing of drive and control elements connected to the machine.

Figure 7:
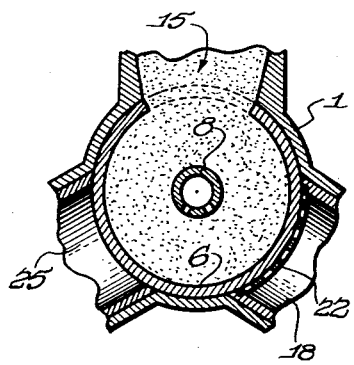
FIGURES 7, 8 and 9 are fragmentary cross-sectional views of the machine with elements in changed positions.

Referring to FIGURES 1 and 2, a body or housing 1 contains and supports all parts of the machine except the driving means, controls and beverage reservoir therefor.

A hopper assembly 2 secured to the housing by screw 3 is provided to retain and gravity feed a supply of granulated or powdered solid beverage ingredients to the inlet of housing 1.

In order to provide uniform feeding of the ingredients to the inlet of the housing and to prevent packing thereof in the lower portion of the hopper, an agitator is provided comprising a horizontal shaft 4 journalled in bearings 5 in the lower portion of hopper 2. The shaft has mounted thereon a plurality of fingers 5 positioned to rotate directly above the housing inlet as shown in FIGURES 1 and 2.

Figure 8:
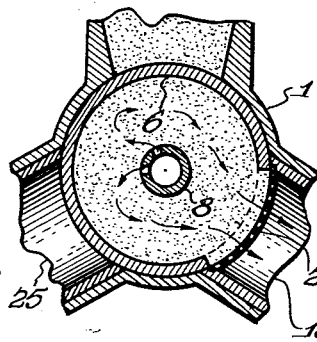
Figure 9:
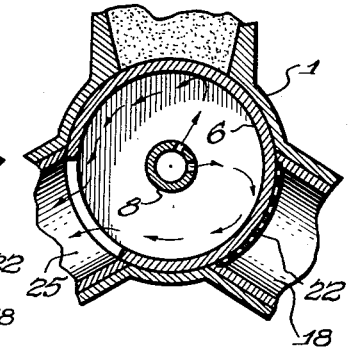
Figure 5:
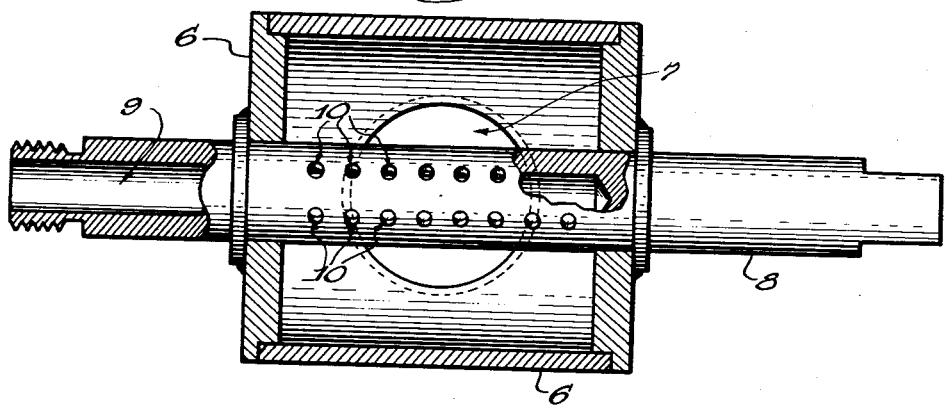
FIG. 5 is an enlarged cross-section view of the infusion barrel in the machine.

Referring to FIGURE 5, a hollow cylinder or barrel 6 has a circular port 7 in the mid-portion of its periphery and is coaxially secured on a main shaft 8. A bore 9 entering one end of the shaft provides a passage for liquid through a plurality of diffusion holes 10 positioned through the side of the shaft opposite port 7, thus forming a water diffuser for thoroughly permeating the ingredients in the barrel as illustrated (FIGS. 8 and 9).

The left end of the shaft is threaded to engage a conventional rotary seal and the right-hand end of the shaft is adapted to be intermittently driven by a motor driven intermittent unit.

Referring to FIGURES 2 and 4, the housing 1 has a cylindrical bore therein for retaining, in close concentric proximity, the barrel 6 with the right-hand end of its shaft 8 journalled for rotation in a bearing 11 as shown. The left-hand end of the shaft is journalled for rotation in a cover plate 12 and terminated in a rotary seal assembly 13 which retains a hot water inlet conduit 14 in stationary relation with the housing 1.

The housing 1 is formed to include a cylindrical ingredient inlet port 15 adapted to coincide with the port 7 in barrel 6 when the latter is positioned as shown in FIG. 4. The housing also includes a cylindrical beverage outlet port 16 radially positioned approximately 120 degrees from said inlet 15, and a like scavenging or rinsing port 17 is radially positioned between port 15 and port 16.

Figure 6:
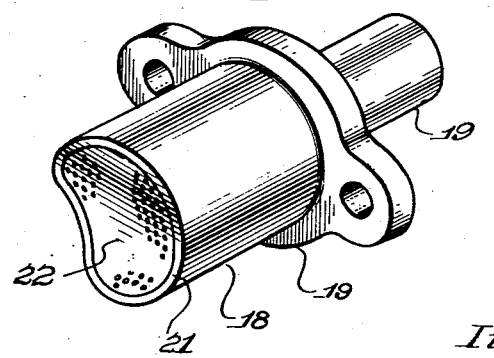
FIG. 6 is an enlarged perspective view of a filter assembly shown FIG. 1.

FIG. 6 illustrates a filter assembly which is slideably positioned in the outlet port 16 and comprises a cylindrical collar 18, having an outside diameter somewhat larger than the diameter of port 7 in the barrel 6. The collar is threaded on a flange member 19 which has a tubular extension to which is attached a conduit 20 for conducting the finished beverage from the machine.

The outer end surface 21 of the collar 18 is cylindrically shaped to provide a sealing contact with outer surface of the barrel 6. A cylindrically shaped foraminated member 22 is secured to the end of the collar 18 with its outer surface coplanar with the end surface 21. Thus, the member 22 will permit the passage of a beverage therethrough and retain the solid ingredients in the barrel 6.

Referring to FIG. 2, the filter assembly is urged into sealing frictional contact with the barrel 6 by springs 23 and screws 24 threaded into housing 1 as shown.

It is to be noted that the size and number of perforations in the filter member 22 are dependent upon the type of ingredients used. The construction shown contemplates a simple interchange of collars having perforations of different sizes.

A scavenger assembly shown FIGS. 1 and 4 is slideably positioned in the port 17 and consists of a collar 25 having a pair of oppositely disposed ears 26. The inner end surface of the collar is shaped the same as collar 18 but open therethrough. This member is also urged into sealing frictional contact with the barrel 6 by springs 27 and screws 28 threaded into housing 1.

Referring to FIGURES 2 and 3, the agitator fingers 5 secured to shaft 4 are rotated from main shaft 8 by sprocket 29, chain 30 and sprocket 31 as shown.

A particular type of drive and control means for the machine above described are shown in FIG. 10 in which the main shaft 8 is adapted to be driven by an intermittent drive unit 32. A conventional 120 degree dwell Geneva drive unit is preferred but any one of several well-known intermittent movements may be used. An electric gear reducer motor 33 is adapted to drive the unit 32 to rotate the shaft 8 at a proper speed corresponding with a proper infusion dwell for a particular beverage ingredient.

An adjustable normally closed solenoid valve 34 is connected to the hot water inlet conduit 14 for controlling the hot water input to the machine from a source of pressurized hot water.

In use, the machine has its outlet conduit 20 connected to a storage reservoir 35 and the latter has its outlet 36 controlled by a normally closed solenoid valve 37 which may be remotely energized to open for beverage delivery by a simple circuit not shown.

A float 38 in the reservoir is adapted to close a cycling switch 39—40 when the beverage reaches a predetermined low level.

A one revolution normally closed control switch 41—42 under the control of a single dwell cam 43 on shaft 8a is adapted to be driven in timed relation with shaft 8 and to open when the drive shaft 8 is in its rest position with the barrel port positioned between outlet 17 and inlet 15.

A dual dwell cam 44 also on shaft 8a is adapted to close water control switch 45—46 when the machine is in its infusion and its scavenger positions respectively.

A conductor 47 connects one side of a source of electric power L₁ to one terminal of motor 33 and one terminal of valve 34.

A conductor 48 connects the remaining side of the source of power L₂ to switch blade 45, switch blade 41 and switch blade 39.

A conductor 49 connects the remaining terminal of valve 34 to switch blade 46.

Conductor 50 connects the remaining terminal of motor 33 to the switch blade 42 and switch blade 40 and completes the circuitry for the machine.

The three cycles of operation are illustrated in FIGURES 7, 8 and 9 in which FIG. 7 is the loading cycle when the barrel port 7 is positioned in register with the inlet passageway 15 which permits the ingredients to descend by gravity and fill the barrel 6.

Under the assumption switch 39—40 shown in FIG. 10 has been closed by the descent of the float 38 in the reservoir, the operation of the intermittent drive unit 32 by motor 57 will rotate the barrel 6 to position shown in FIG. 8 where it will dwell for the infusion cycle. Simultaneously, cam 44 will close switch 45—46 and energize valve 34 releasing pressurized hot water to flow from a source not shown, through shaft 8 and out of the diffusion holes 10 therein. The beverage resulting from the infusion process is strained by filter 22 and discharged through conduit 20 into reservoir 35. Near the end of the infusion cycle, the float 38 will rise to a predetermined level and open the cycling switch 39—40 and permit the control switch 41—42 to maintain and stop the operation of motor 33 for completing a normal cycle of the machine.

At the end of the infusion cycle, determined by the dwell of unit 32, the barrel 6 will begin rotation toward position in FIG. 9 and the cam 44 will close valve 34 and stop the flow of hot water. During this rotation, the edge of the barrel surrounding port 7 will wipe residue ingredients from the filter for proper filter operation of the next successive infusion cycle.

When the barrel reaches and dwells in the position shown in FIG. 9, the scavenger cycle will begin and the second dwell on the cam 44 will again operate the water switch 45—46 and disperse water through holes 10 in the shaft 8 and flush the spent ingredients from barrel 6 through collar 25 into waste conduit 25a.

At the completion of the scavenger cycle, the barrel will again begin rotation through a small angle when the dwell in cam 43 will open control switch 41—42 and stop the machine.

When the beverage in the reservoir is depleted to a predetermined level by the operation of valve 37 and the float 38 descends in the reservoir, the resulting closure of switch 39—40 will short circuit switch 41—42 and the machine will recycle continuously until the reservoir contains a predetermined supply of beverage. It will be understood by those skilled in the art that the same results may be obtained by substituting a mechanically operated valve equivalent to 34 cooperatively related to a two dwell cam like 44 and thus eliminate the electric circuit which includes switch 45—46 and the electric valve 34.

An alternate construction comprehends the beverage outlet 16 and the scavenger outlet 17 substantially in coaxial position with each other on opposite sides of the housing 1, thus providing for a two-dwell intermittent rotation of barrel 6 depending upon the gravity loading of ingredients by the barrel as the port 7 therein passes the inlet passageway 15.

Having described my invention, I claim:

1. A beverage machine comprising means forming a housing having cylindrical bore therein, said means also forming a first and second port disposed substantially in radial relation about the principal axis of said bore and entering therein, a hollow cylindrical barrel fixed to a coaxial shaft, fitted in said bore in close proximity with the walls thereof and adapted for rotation therein with said shaft journalled in said housing, a barrel port through the cylindrical wall of said barrel, said shaft having a passageway in one end thereof entering said barrel for conducting pressurized hot water therein when said water is supplied to said shaft, a hopper means secured to said housing for gravity feeding solid ingredients stored therein into said first of said housing ports, a foraminated filter member positioned in said second said housing port having its inner end surface shaped to the curvature of the outer surface of said barrel and positioned in frictional contact therewith, a marginal surface of said end surface forming a seal against said barrel, spring means for urging said filter member against said barrel whereby the registration of said barrel port with said first housing port will permit said barrel to fill with a predetermined volume of said ingredients from said hopper means and whereby the rotation of said barrel with its said port registered with said second housing port and in sealed relation with said marginal surface will permit said pressurized water supplied to said shaft to infuse with said ingredients and whereby the resultant beverage will flow through said filter means and discharge from said second housing port whereby during further rotation of said barrel, the edge of said barrel port will dislodge and remove said ingredients adhering to said filter member.

2. In a beverage machine comprising means forming a housing having a cylindrical bore therein, said means also forming three cylindrical housing ports disposed substantially in radial relation about the principal axis of said bore and entering therein, a hollow cylindrical barrel fixed to a coaxial shaft fitted in said bore in close proximity therewith and adapted for rotation therein with said shaft journalled in said housing, said barrel having a port through its cylindrical wall positioned to sequentially register with each of said housing ports when said barrel is rotated, said shaft having a bore entering one end thereof and terminating in said barrel for conducting hot water from a pressurized source into said barrel, a hopper means secured to said housing for gravity feeding granulated solid ingredients stored therein into the first of said housing ports, a cylindrical filter sleeve slideably positioned in a said second said housing port terminating in a beverage outlet at its outer end, the inner end of said filter sleeve terminating in an end portion having a surface shaped to form a sealing contact with the cylindrical outer surface of said barrel, a foraminated filter member in said sleeve with its outer surface flush with the said surface of the said inner end of said filter sleeve, spring means for urging said sleeve against said barrel, a cylindrical scavenger sleeve slideably positioned in a third said housing port terminating at its outer end in a waste outlet and its inner end shaped to form a sealing contact with the outer surface of said barrel, a second said spring means for urging said scavenger sleeve against said barrel whereby the intermittent rotation of said barrel will sequentially position said barrel port in register with each of said housing ports first fill said barrel with said ingredients, then conduct said hot water into said barrel for infusion with said ingredients and discharge said finished beverage through said filter member from said beverage outlet and then scavenging the spent ingredient and said water from said barrel through said waste outlet.

3. In a beverage machine of the character described, a housing forming a multi-ported hollow cylinder, a hollow barrel having a single port therein journalled for rotation in said cylinder about its principal axis for infusing therein a mixture of water and solid beverage ingredient, a cylindrical beverage port through said housing positioned with its principal axis substantially normal to the axis of said barrel, a cylindrical filter member slideably positioned in said beverage port including a beverage outlet at its outer end, the inner end surface of said member shaped to conform with the outer surface of said barrel for marginal sealing contact therewith, a foraminated filter in said member having its outer surface flush with the said inner end surface of said member, spring means for urging said member into sealing contact with said barrel, means for conducting solid ingredients and hot water into said barrel whereby a beverage infused in said barrel will pass through said filter and discharge from said outlet when said barrel is rotated with its said single port in register with said beverage port and when said filter member is in sealed marginal relation with said single port.

References Cited in the file of this patent

UNITED STATES PATENTS

| | | |
|---|---|---|
| 455,832 | Muller | July 14, 1891 |
| 686,515 | Geddes | Nov. 12, 1901 |
| 1,164,619 | Jefferson | Dec. 14, 1915 |
| 1,804,795 | Lee | May 12, 1931 |
| 1,805,159 | Bauer et al. | May 12, 1931 |
| 2,014,325 | Grilli | Sept. 10, 1935 |
| 2,149,270 | Burgess | Mar. 7, 1939 |
| 2,292,276 | Knoll | Aug. 4, 1942 |
| 2,452,933 | Joppich et al. | Nov. 2, 1948 |
| 2,537,053 | Hemmeter | Jan. 9, 1951 |
| 2,638,137 | De Back | May 12, 1953 |

FOREIGN PATENTS

| | | |
|---|---|---|
| 279,363 | Germany | Oct. 19, 1914 |
| 467,300 | Italy | Dec. 1, 1951 |
| 1,086,762 | France | Aug. 18, 1954 |